(12) United States Patent
Finley et al.

(10) Patent No.: US 7,467,536 B2
(45) Date of Patent: Dec. 23, 2008

(54) POSITIONING SYSTEM FOR SINGLE OR MULTI-AXIS SENSITIVE INSTRUMENT CALIBRATION AND CALIBRATION SYSTEM FOR USE THEREWITH

(75) Inventors: Tom D. Finley, Yorktown, VA (US); Peter A. Parker, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 414 days.

(21) Appl. No.: 11/428,017

(22) Filed: Jun. 30, 2006

(65) Prior Publication Data

US 2008/0202199 A1     Aug. 28, 2008

Related U.S. Application Data

(60) Provisional application No. 60/740,292, filed on Nov. 21, 2005.

(51) Int. Cl.
G01C 17/38     (2006.01)
G01C 25/00     (2006.01)
G01P 21/00     (2006.01)

(52) U.S. Cl. .................. 73/1.38; 73/1.37; 73/1.77; 73/1.79; 33/534

(58) Field of Classification Search .............. 73/1.37, 73/1.38, 1.75–1.81; 33/534
See application file for complete search history.

(56) References Cited

U.S. PATENT DOCUMENTS

| | | | |
|---|---|---|---|
| 3,352,164 A * | 11/1967 | Rosen | 74/5.34 |
| 4,414,838 A | 11/1983 | Ward et al. | |
| 4,711,125 A * | 12/1987 | Morrison | 73/178 R |
| 4,869,092 A * | 9/1989 | Bernard et al. | 73/1.38 |
| 5,421,187 A * | 6/1995 | Morgan | 73/1.78 |
| 5,531,115 A * | 7/1996 | Erdley | 73/504.02 |
| 5,533,380 A | 7/1996 | Ferris | |
| 5,646,476 A | 7/1997 | Aston | |
| 6,209,383 B1 * | 4/2001 | Mueller et al. | 73/1.37 |
| 6,421,622 B1 | 7/2002 | Horton et al. | |

(Continued)

OTHER PUBLICATIONS

Peter A. Parker and R. Deloach, "Single-Vector Calibration of Wind-Tunnel Force Balances," NASATech.com p. 1-3, date unknown.

(Continued)

*Primary Examiner*—David A. Rogers
(74) *Attorney, Agent, or Firm*—Helen M. Galus (57) ABSTRACT

A positioning and calibration system are provided for use in calibrating a single or multi axis sensitive instrument, such as an inclinometer. The positioning system includes a positioner that defines six planes of tangential contact. A mounting region within the six planes is adapted to have an inclinometer coupled thereto. The positioning system also includes means for defining first and second flat surfaces that are approximately perpendicular to one another with the first surface adapted to be oriented relative to a local or induced reference field of interest to the instrument being calibrated, such as a gravitational vector. The positioner is positioned such that one of its six planes tangentially rests on the first flat surface and another of its six planes tangentially contacts the second flat surface. A calibration system is formed when the positioning system is used with a data collector and processor.

32 Claims, 5 Drawing Sheets

U.S. PATENT DOCUMENTS

| | | |
|---|---|---|
| 6,629,446 B2 | 10/2003 | Parker |
| 6,729,176 B2 * | 5/2004 | Begin .......................... 73/1.38 |
| 6,758,080 B1 * | 7/2004 | Ragan et al. ................. 73/1.38 |
| 6,778,924 B2 | 8/2004 | Hanse |
| 6,813,584 B2 | 11/2004 | Zhou et al. |
| 6,823,279 B1 | 11/2004 | Nadkarni et al. |
| 6,826,502 B2 * | 11/2004 | Savard ....................... 702/104 |
| 6,834,528 B2 * | 12/2004 | Kappi et al. ................. 73/1.75 |
| 6,853,947 B1 | 2/2005 | Horton |
| 6,918,299 B2 | 7/2005 | Vanzandt et al. |
| 6,968,281 B2 | 11/2005 | Hanse |
| 7,299,556 B2 * | 11/2007 | Lippuner .................... 33/290 |
| 7,359,047 B2 * | 4/2008 | Lippuner ................. 356/243.1 |
| 2002/0088268 A1 | 7/2002 | Parker |
| 2005/0126024 A1 * | 6/2005 | Kunzi et al. ............. 33/366.16 |
| 2005/0166410 A1 | 8/2005 | Richter et al. |
| 2006/0164073 A1 * | 7/2006 | Bergsma .................... 324/202 |
| 2007/0124097 A1 * | 5/2007 | Geck et al. .................. 702/116 |
| 2008/0177492 A1 * | 7/2008 | Woodmansee et al. ........ 702/95 |

OTHER PUBLICATIONS

"Multi-Axis Accelerometer," Entran.com p. 1-5, date unkown.

* cited by examiner

POSITIONING SYSTEM FOR SINGLE OR MULTI-AXIS SENSITIVE INSTRUMENT CALIBRATION AND CALIBRATION SYSTEM FOR USE THEREWITH

ORIGIN OF THE INVENTION

Pursuant to 35 U.S.C. §119, the benefit of priority from provisional application 60/740,292, with a filing date of Nov. 21, 2005, is claimed for this non-provisional application.

This invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to the calibration of single or multi-axis sensitive instruments, such as an inertial-based attitude measurement instruments or inclinometers. More specifically, the invention is a positioning system used for single or multi-axis sensitive instrument calibration and a calibration system that can be used with the positioning system.

2. Description of the Related Art

Many well-known single or multi-axis sensitive instruments, which when used typically require their orientations to be moved through known rotations about a fixed field, are commonly used. A few examples of these types of devices include a magnetometer, a gyro, an optical system, and an inertial-based attitude measurement instrument.

Inertial-based attitude measurement instruments are more commonly known as angle measurement instruments or inclinometers. One type of inertial-based angle measurement system is the quartz flexure accelerometer that is routinely used in wind-tunnel experimentation. These accelerometers can be single or multi-axis sensitive devices. The accelerometers measure static acceleration with respect to the earth's gravitational field and produce an electrical current that is proportional to their orientation relative to the earth's gravitational field reference. More specifically, the current is proportional to the sine of the angle between a plane that is normal to the earth's gravity vector and the internal axis of the accelerometer. In other words, the accelerometer is sensitive to changes in its orientation with respect to level, however it is insensitive to rotations about the earth's gravitational vector. The change in current with respect to the change in acceleration is called the sensitivity. When the accelerometer is in a level orientation, it produces a near-zero current, i.e., not exactly zero due to an internal electrical imbalance referred to as the bias.

To convert the differential current to a differential voltage for more convenient measurement by a data acquisition system, a precision resistor can be placed across the accelerometer's output terminals. Hereinafter, this electrical signal is referred to as the accelerometer's response. The accelerometer also typically includes a temperature sensor that produces a current proportional to the internal temperature of the device. In a similar manner, a resistor can be placed across the temperature sensor output terminals to provide a temperature-induced voltage response also referred to as the temperature sensor output. Due to the construction of the device, the accelerometer's bias and sensitivity vary with temperature, and therefore a calibration model of the device typically incorporates temperature compensating coefficients.

Combining three single-axis quartz flexure accelerometers forms a triaxial accelerometer system that is used in wind-tunnel experimentation to measure pitch and roll. The accelerometer can also be used for alignment and the detection of relative movement in mechanical joints. The triaxial accelerometer system incorporates three mutually orthogonal accelerometers mounted in a rigid housing. Note that the alignment in the housing is more accurately described as near-orthogonal due to fabrication imperfections of the housing and the internal misalignment of the sensitive axes of the accelerometer with respect to its external case. The triaxial accelerometer system provides simultaneous measurements of the projection of the gravitational vector onto a three-axis Cartesian coordinate system thereby enabling the prediction of sensed pitch and roll angles through trigonometric relationships. In any orientation, two angles can be determined.

The highest angular sensitivity, and thereby the most accurate angle measurement, is achieved when a sensitive axis of the (single or multi-axis) accelerometer is oriented perpendicular to the gravitational vector. In this near-level position, the accelerometer is said to be in its sensitive attitude. As the device is moved away from its sensitive attitude, there is a corresponding deterioration in the measurement resolution. For small angles, the device remains highly accurate. However, in the limiting case, the device's sensitive axis is collinear with the gravitational vector resulting in coarse predictions of angular orientation. By employing three accelerometers simultaneously, at least two of the individual devices will be less than 45° away from their sensitive attitude regardless of the orientation of the triaxial system. This maximum deviation is derived from the orientation when two of the three accelerometers sense equal components of the gravitational vector. Using this strategy, the triaxial system design performs a trade-off among the relative contribution of the individual accelerometers in determining the projected gravitational components in any orientation.

Prior to use, single or multi-axis accelerometers must be calibrated. Previous calibration systems rely on precise angular positioning of an accelerometer using a mechanically complex sequence of rotary tables mounted in a known (near-level) orientation relative to the gravitational coordinate system. While these systems represent the state-of-the-art in accelerometer calibration, they also possess certain weaknesses. For example, these systems are costly and are permanently mounted in a laboratory thereby making them incompatible for in-situ calibration. In addition, they require a complex calibration procedure to partially compensate for the near-levelness of the mounting surface and the orthogonal misalignment among the sequence of rotary tables.

SUMMARY OF THE INVENTION

Accordingly, it is an object of the present invention to provide a system that can be used to position a single or multi-axis sensitive instrument for calibration and a calibration system for use therewith.

Another object of the present invention to provide a system that can be used to position a single or multi-axis sensitive instrument for a simple in-situ calibration procedure.

Another object of the present invention to provide a system that can be used to position an inertial-based attitude measurement instrument for calibration and a calibration system for use therewith.

Yet another object of the present invention to provide a system that can be used to position an inertial-based attitude measurement instrument for a simple in-situ calibration procedure.

Other objects and advantages of the present invention will become more obvious hereinafter in the specification and drawings.

In accordance with the present invention, a positioning and calibration system are provided for use in calibrating a single or multi-axis sensitive device. While the following description and figures, by way of illustration only, include details relative to the calibrating of an inclinometer, it will be readily apparent to one of ordinary skill in the art that the type of axis sensitive instrument being positioned/calibrated is not a limitation of the present invention, nor is the type of inclinometer referenced. Specifically, it should be understood that the present invention can be used to test and calibrate a wide variety of single or multi-axis sensitive devices or instruments. For example, it is within the scope of the present invention to test and calibrate: a magnetometer relative to the earth's magnetic field; a gyro relative to the earth's rotational field or relative to an induced rotational field; an optical system relative to a fixed light source(s), etc.

The positioning system includes a positioner that defines six planes of tangential contact. A mounting region within the six planes is adapted to the axis sensitive instrument (e.g. inclinometer) coupled thereto such that each axis of sensitivity of the instrument is approximately parallel to four planes of the six planes and perpendicular to two opposing ones of the six planes that are not included in the four planes. The positioning system also includes means for defining first and second flat surfaces that are approximately perpendicular to one another with the first surface adapted to be oriented relative to a local or induced field, such as a gravitational vector if the instrument is an inclinometer. The positioner is positioned such that one of its six planes tangentially rests on the first flat surface and another of its six planes tangentially contacts the second flat surface. A calibration system is formed when the positioning system is used with data collection and processing means adapted to be coupled to the instrument.

DETAILED DESCRIPTION OF THE INVENTION

Figure 1:
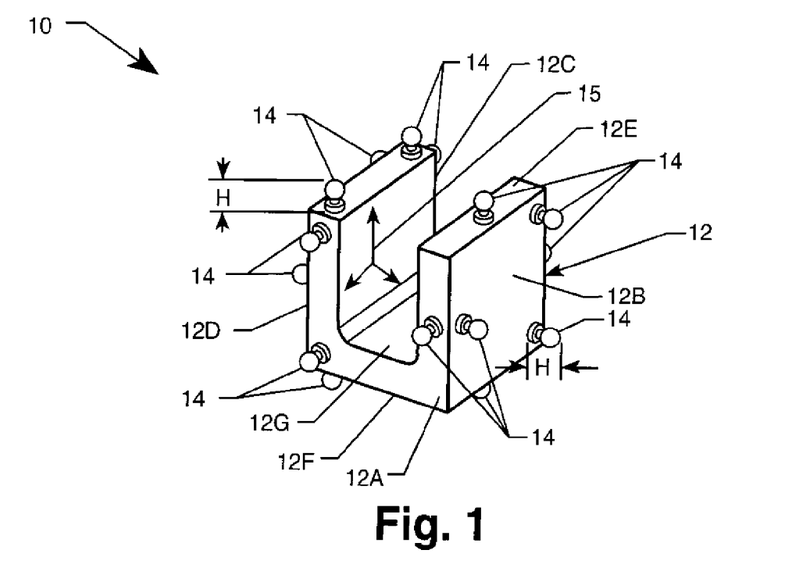
FIG. 1 is a perspective view of a cuboidal frame positioner forming part of the positioning system being used to calibrate a single or multi-axis inclinometer in accordance with the present invention.

Referring now to the drawings and more particularly to FIG. 1, a cuboidal frame positioner is shown in isolation and is referenced generally by numeral 10. Cuboidal frame positioner 10 forms the basic structure of the positioning system of the present invention. More specifically, cuboidal frame positioner 10 can support a single or multi-axis inclinometer such as an accelerometer (not shown) that is to be positioned for calibration in accordance with the teachings of the present invention. As stated above, as will be readily apparent to one of ordinary skill in the art, the type of axis sensitive instrument being positioned/calibrated (an inclinometer), is not a limitation of the present invention, nor is the type of inclinometer referenced. However, by way of illustrative example, the remainder of the description will make reference to the positioning/calibration of a tri-axial accelerometer having three mutually orthogonal axes of sensitivity. Such devices are well-known and understood in the art. If the device is equipped for temperature sensing, the present invention can be adapted to also collect temperature data as will be explained later herein.

Positioner 10 includes a rigid frame 12 to support an accelerometer (not shown) in a test position. In the illustrated example, a piece of rigid material (e.g., metal, composite, etc.) defines a cube shape having six planes 12A-12F. Frame 12 is partially hollowed out to define a mounting region 12G within planes 12A-12F. To simplify coupling of an accelerometer to frame 12, the cross-sectional shape of frame 12 can be U-shaped as illustrated.

Attached to frame 12 at each of planes 12A-12F are contact feet 14 that define tangential contact planes for positioner 10. As shown, each of planes 12A-12F has three contact feet 14 coupled thereto with the outboard tips thereof defining a unique plane. If contact feet 14 associated with a given plane 12A-12F have the same height H, then the aforementioned unique plane will be parallel (or approximately parallel) to its associated plane 12A-12F. In this way, the planes defined by contact feet 14 define a cuboidal set of tangential contact planes.

The outboard tip of each contact foot 14 is preferably rounded for reasons that will be explained further below. In the illustrated example, contact feet 14 comprise rigid balls. However, it is to be understood that each contact foot 14 could be defined by a protuberance having an outboard tip defining a tangential point of contact.

As mentioned above, mounting region 12G supports an accelerometer to be tested. To maintain clarity of illustration, only the accelerometer's mutually orthogonal axes of sensitivity are shown and are referenced by coordinate arrow set 15. Thus, for a triaxial accelerometer having three mutually orthogonal x,y,z axes of sensitivity, the accelerometer is positioned on and coupled to mounting region 12G such that each sensitive axis is aligned (i) parallel (or approximately parallel) to four of the six tangential contact planes defined by contact feet 14, and (ii) perpendicular (or approximately perpendicular) to the other two (i.e., opposing) tangential contact planes defined by contact feet 14.

Figure 2:
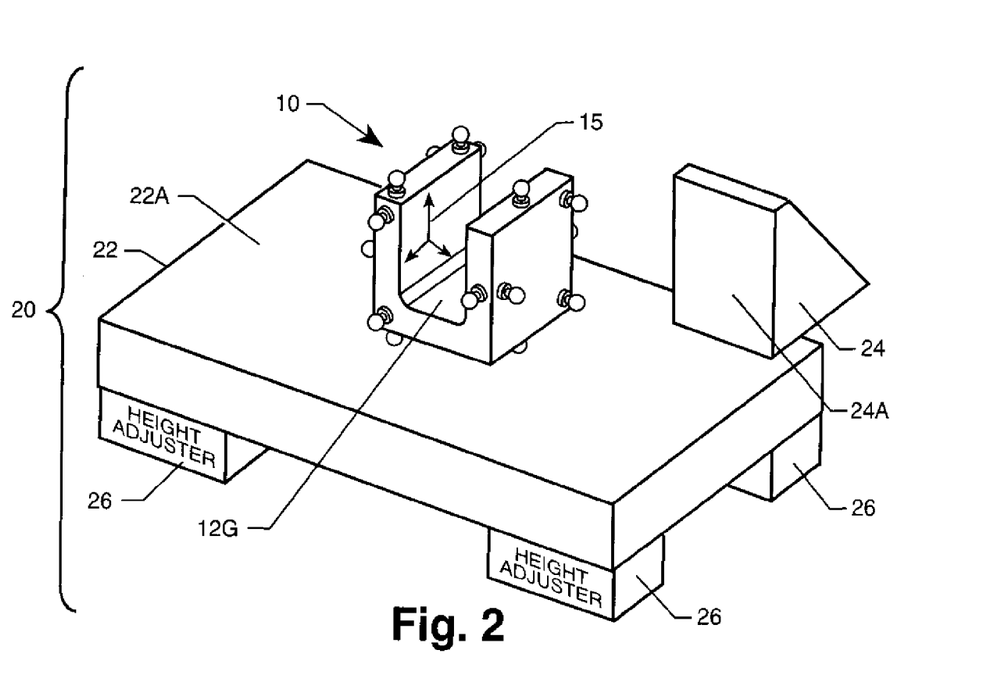
FIG. 2 is a perspective view of the positioning system in accordance with an embodiment of the present invention.
Figure 3:
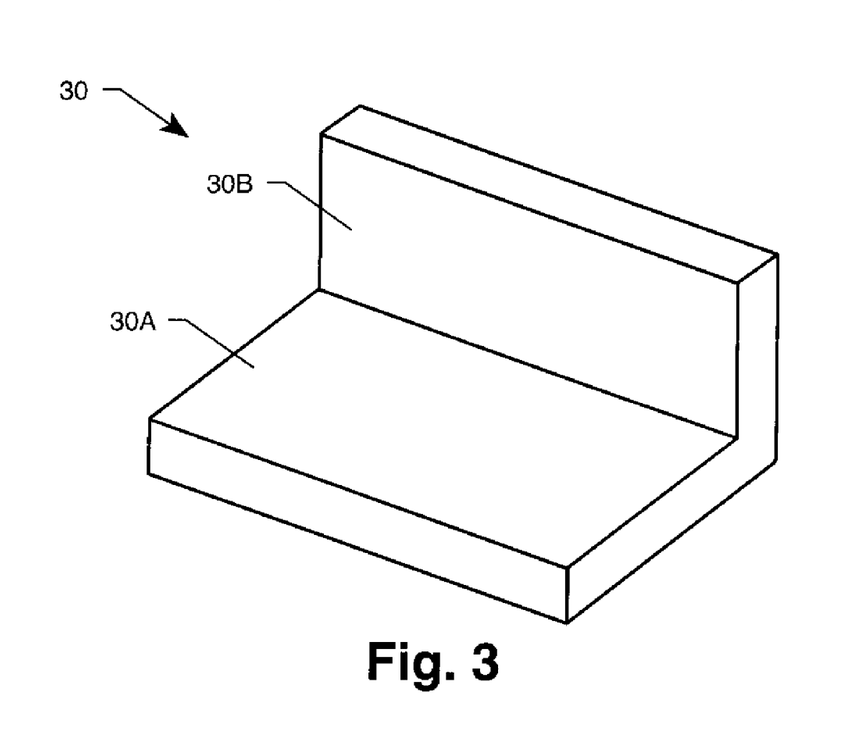
FIG. 3 is a perspective view of an L-shaped table top that can be used in the positioning system.

Referring now to FIG. 2, an embodiment of the positioning system in accordance with the present invention is shown and is referenced generally by numeral 20. Positioning system 20 includes positioner 10, a planar top table 22, and an alignment frame 24. Planar top table 22 is any block of material, table-like structure, etc., that defines a flat surface 22A. Alignment fence 24 is any block of material or other structure that defines a flat surface 24A and that can be placed on flat surface 22A such that flat surfaces 22A and 24A are perpendicular (or approximately perpendicular) to one another. For example, planar top table 22 could be made from a slab of granite and fence 24 could be made from a separate piece of wedge-shaped granite. The relationship of table 22 and fence 24 can be provided by two separable elements (FIG. 2), or could be provided by a single L-shaped table top 30 as shown in FIG. 3. Table top 30 is constructed to have flat surfaces 30A and 30B perpendicular (or approximately perpendicular) to one another.

As will be explained further below, flat surface 22A or 30A is ideally oriented in a plane normal to the earth's local gravitational vector. In other words, ideally, flat surface 22A or 30A should be leveled prior to performing in-situ calibrations of an accelerometer coupled to positioner 10. Accordingly, height adjusters 26 can be positioned (e.g., temporarily or permanently) at a minimum of three locations under planar top table 22 or (L-shaped table top 30). Since in-situ leveling may not be exact, a calibration procedure should preferably be used that accommodates a flat surface 22A or 30A that is approximately perpendicular to the level gravitational vector as will be explained further below.

In the ensuing description, the positioning system of the present invention will be used as part of an in-situ calibration system for an accelerometer (e.g., a triaxial accelerometer in the illustrated example). The disclosed calibration system enables the estimation of the calibration coefficients, requires a minimal number of design points, and defends against systematic errors. In addition, a new mathematical modeling approach is disclosed that simplifies the coefficient estimation and data reduction.

Prior to describing the novel modeling approach, a brief description of the known art mathematical model used to characterize a triaxial accelerometer system will be described. This known art model is based on the non-linear trigonometric relationship between the electrical signal response and the angular orientation of the device and is given by $$x = \sin^{-1}\left(\frac{y-b}{S}\right)$$

where x is the angle between the accelerometer's sensitive axis and the earth's gravitational vector, y is the electrical signal response of the accelerometer, b is the bias, and S is the sensitivity.

In a triaxial system, additional model parameters are required to compensate for the cross-axis sensitivity that results from the near-orthogonal mounting of the individual accelerometers in the accelerometer housing/package. The additional parameters are the coning angle $\Omega$, azimuth angle $A_z$, pitch angle $\alpha$, and roll angle R. For an accelerometer that is sensitive to level relative to the x-axis, the coning angle is defined by the angle from the x-axis to the sensitive axis of the accelerometer and is usually less than one degree. The azimuth angle is the angle formed by the projection of the sensitive axis onto the yz-plane. Similar definitions exist for the other two accelerometers that are sensitive to level relative to the y-axis and z-axis.

The model relating the response of each accelerometer ($v_x$, $v_y$, $v_z$) and the angular orientation thereof is given by $v_x = b_x + S_x[\cos \Omega_x \sin \alpha - \sin \Omega_x \cos \alpha \sin(R + A_x)]$ $v_y = b_y - S_y[\cos \Omega_y \sin R \cos \alpha - \sin \Omega_y (\sin A_y \sin \alpha - \cos A_y \cos R \cos \alpha)]$ $v_z = b_z - S_z[\cos \Omega_z \cos R \cos \alpha - \sin \Omega_z (\cos A_z \sin \alpha - \sin A_z \sin R \cos \alpha)]$ where the subscripts x, y, and z denote the particular accelerometer that is aligned with the indicated axis. Note that the model also includes a random error term (not explicitly included) which is always present in experimental data. In order to estimate the calibration coefficients from this set of equations, an approximate solution can be used, although an iterative method based on the Gauss-Newton algorithm is generally recommended. In addition, to apply the calibration coefficients in practice during data reduction, a non-linear solution is also required.

Figure 4:
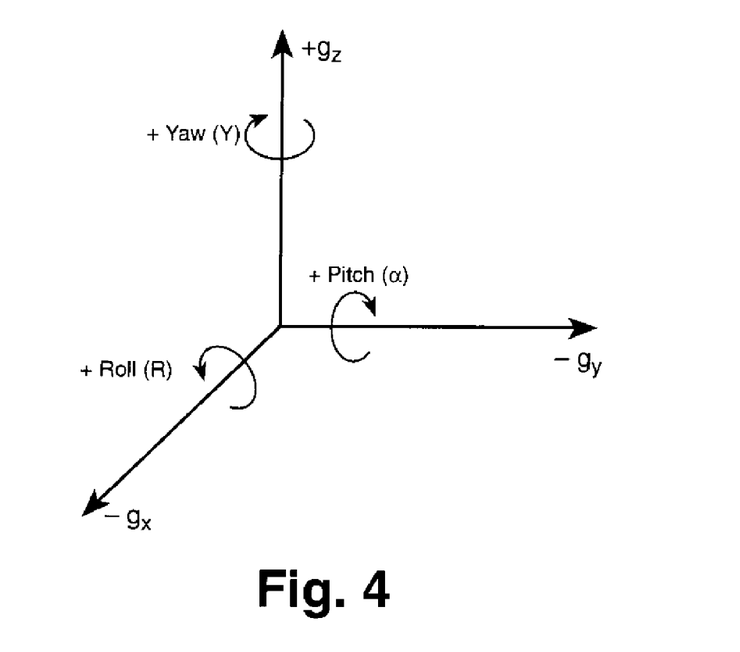
FIG. 4 is a graphic depiction of a Cartesian coordinate system aligned with the earth's gravitational vector.

In contrast to this non-linear modeling approach, the present invention uses a linear model. Instead of modeling the relationship between the response and the angle, as is the case with the non-linear model, the linear approach models the relationship between the accelerometer response and the projection of the gravitational vector (reference field) onto the Cartesian coordinate system of the triaxial accelerometer. The projection of the gravitational vector is illustrated in FIG. 4 where the vector components are denoted by $g_x$, $g_y$, and $g_z$ and are subsequently referred to as g-vectors. The $g_z$ vector is aligned with the earth's gravitational vector. The linear calibration model is given by $v_x = \beta_{0_x} + \beta_{1_x} g_x + \beta_{2_x} g_y + \beta_{3_x} g_z + \epsilon_x$ $v_y = \beta_{0_y} + \beta_{1_y} g_x + \beta_{2_y} g_y + \beta_{3_y} g_z + \epsilon_y$ $v_z = \beta_{0_z} + \beta_{1_z} g_x + \beta_{2_z} g_y + \beta_{3_z} g_z + \epsilon_z$ where, for the x-axis of sensitivity, $\beta_{0_x}$ is the bias, $\beta_{1_x}$ is the sensitivity, $\beta_{2_x}$ is the coefficient for the cross-axis sensitivity of $g_y$, $\beta_{3_x}$ is the coefficient for the cross-axis sensitivity of $g_z$, and $\epsilon_x$ is an independently and identically distributed random error for the x-axis accelerometer. The definitions for the y-axis and z-axis terms follow accordingly.

Comparing this linear model to the non-linear model, the bias term bx is equivalent to $\beta_{0_x}$, and the sensitivity Sx is equivalent to $\beta_{1_x}$. Differing from the non-linear model, the misalignment terms $\beta_{2_x}$ and $\beta_{3_x}$ are in vector components rather than polar coordinates. The other model terms are similarly defined for the y-axis and z-axis accelerometers denoted by their respective subscripts. Note that the terms corresponding to the sensitivity constant for the y- and z-axis are $\beta_{2_y}$ and $\beta_{3_z}$, respectively.

The linear model can also be expressed in a more compact matrix notation given by $v' = \beta'_0 g' \beta + \epsilon'$ where $$v' = \begin{bmatrix} v_x \\ v_y \\ v_z \end{bmatrix}^T, \beta'_0 = \begin{bmatrix} \beta_{0_x} \\ \beta_{0_y} \\ \beta_{0_z} \end{bmatrix}^T, g' = \begin{bmatrix} g_x \\ g_y \\ g_z \end{bmatrix}^T, \beta = \begin{bmatrix} \beta_{1_x} & \beta_{1_y} & \beta_{1_z} \\ \beta_{2_x} & \beta_{2_y} & \beta_{2_z} \\ \beta_{3_x} & \beta_{3_y} & \beta_{3_z} \end{bmatrix}, \epsilon' = \begin{bmatrix} \epsilon_x \\ \epsilon_y \\ \epsilon_z \end{bmatrix}^T$$

To estimate the calibration coefficients, a multiple linear regression is performed separately for each response, thereby providing a non-iterative estimation procedure. The estimated vector of bias terms is denoted as $\hat{\beta}'_0$, and the matrix of estimated coefficients without the intercept (bias) term is denoted as $\hat{\beta}$. By using a linear model, a direct, non-iterative solution is also implemented in the data reduction to transform the measured signals into the estimated gravitational components. Substituting the estimated coefficients and solving using straightforward matrix manipulation, the estimated gravitational components $\hat{g}$ are given by $\hat{g}' = (v' - \hat{\beta}_0)' \hat{\beta}^{-1}$ When the accelerometer is equipped for a temperature response, both the bias and sensitivity should be compensated for temperature related effects, which are denoted with a superscript t. Incorporating these temperature compensated terms, it can be shown that the estimated, temperature-compensated gravitational components are computed by $$\hat{g}^t = (v - \hat{\beta}'_0)' \hat{T}_s \hat{\beta}^{-1}$$

where $$\hat{T}_s = \begin{bmatrix} \dfrac{\hat{\beta}_{1_x}}{\hat{\beta}'_{1_x}} & 0 & 0 \\ 0 & \dfrac{\hat{\beta}_{2_y}}{\hat{\beta}'_{2_y}} & 0 \\ 0 & 0 & \dfrac{\hat{\beta}_{3_z}}{\hat{\beta}'_{3_z}} \end{bmatrix}$$

and $\hat{\beta}'_0$ is the vector of bias terms compensated for the observed temperature sensor output (TSO) $\hat{\beta}_{1_x}$ is the sensitivity at the calibration reference TSO, and $\hat{\beta}'_{1_x}$ is the sensitivity compensated for the observed TSO of the x-axis accelerometer. The temperature compensated values of the bias and sensitivity can be computed in a variety of ways to include, for example, linear or second-order approximations. The compact matrix notation and non-iterative form of the estimation and data reduction equations can be easily implemented in a software spreadsheet or in software that performs matrix manipulations.

Once the gravitational components are obtained from the accelerometer signals, equations to compute the accelerometer's angular orientations (FIG. 4) are given by $$\alpha = \sin^{-1}(\hat{g}_x)$$

$$R = \tan^{-1}\left(\dfrac{\hat{g}_y}{\hat{g}_z}\right)$$

As the pitch angle approaches 90°, yaw Y can be computed instead of roll R as given by $$Y = \tan^{-1}\left(\dfrac{\hat{g}_y}{\hat{g}_x}\right)$$

A significant advantage of the linear model is that the three gravitational components are estimated rather than angles. By definition, the root-sum-square (RSS) of the three g-vectors should equal one. Therefore, the residual RSS can be computed to provide an indication of calibration quality and system stability. In the non-linear approach, the pitch and roll angles are estimated and then converted to the gravitational components using a trigonometric relationship. The RSS of these gravitational components are, by definition, equal to one due to a trigonometric identity thereby eliminating the possibility of an analysis of the residual RSS.

Another advantage of working with the gravitational components in the linear model is that they are uniquely determined in any orientation, thereby eliminating the ambiguity and path dependence of an angular solution over wide angle ranges. This is especially true for the case when the pitch angle approaches 90° and a decision rule is implemented to determine whether roll or yaw is the appropriate second angle.

Figure 5:
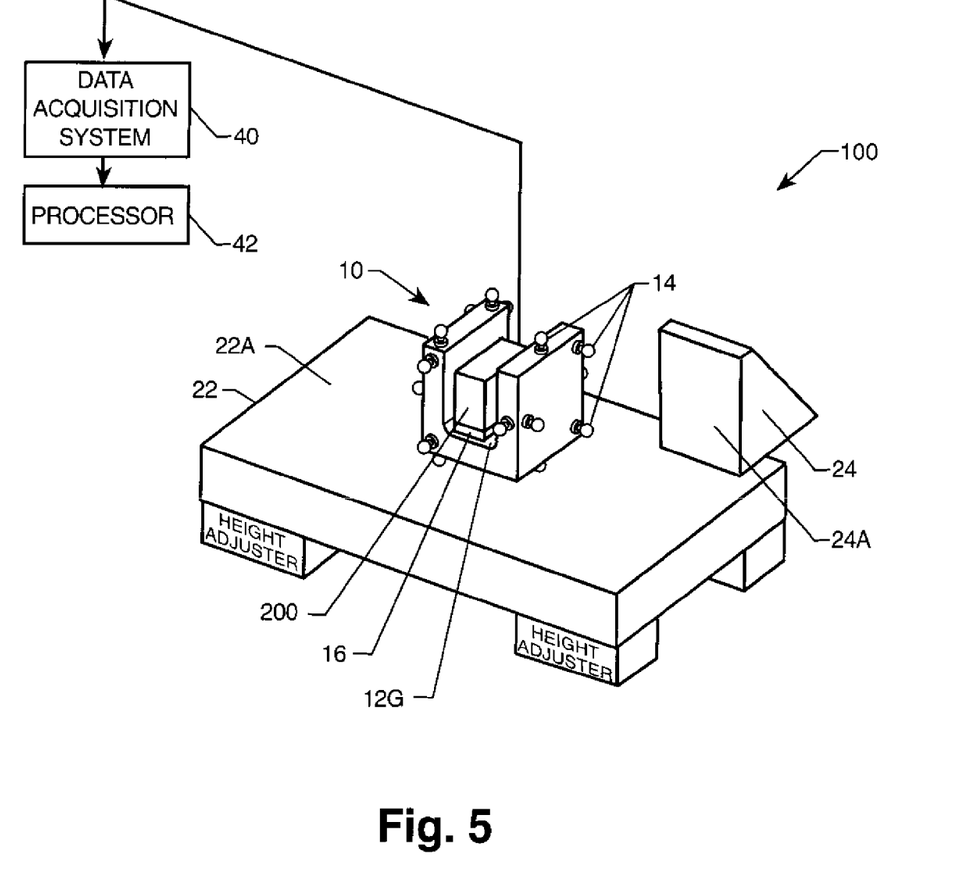
FIG. 5 is a perspective view of the positioning system as part of a calibration system being used for the in-situ calibration of an accelerometer mounted on the positioning system.

Referring now to FIG. 5, the positioning system of the present invention is shown as part of a calibration system that is referenced generally by numeral 100. System 100 includes the above-described positioner 10 shown with a triaxial accelerometer 200 coupled to mounting region 12G. A mechanical interface plate 16 can be used to provide for the repeatability of alignment of the sensitive axes of accelerometer 20 with the tangential contact planes defined by contact feet 14. That is, the shape of interface plate 16 is such that it provides for repeatability of alignment of accelerometer 20 with respect to positioner 10 when plate 16/accelerometer 20 are removed and then re-installed in positioner 10. The relaxation of the tolerances in fabricating positioner 10 is possible since exact set points are not required as long as they are measured and incorporated in the analysis. Therefore, after positioner 10 is fabricated, an initial experiment is performed to define the orientation of the six faces of the cube using multiple pre-calibrated triaxial systems and replicated calibrations. The use of multiple triaxial systems reduces the transferred bias from each device through simple averaging.

To perform device calibration, a triaxial accelerometer 200 is mounted in positioner 10 with the resulting assembly being placed on flat surface 22A such that three of contact feet 14 associated with one of planes 12A-12F rest on flat surface 22A. Flat surface 24A of fence 24 is placed in contact with contact feet 14 of one of the four tangential contact planes 12A-12F that is orthogonal to the tangential contact plane resting on flat surface 22A.

Using the ensuing method, it will be clear that the stability of flat surface 22A is of primary interest as opposed to its levelness. To make the calibration quality robust with respect to the levelness of flat surface 22A, two observations of each design point are obtained by rotating positioner 10 180° in a plane normal to the gravitational vector. Fence 24 ensures an approximate 180° alignment between these rotations. For the six-plane positioner 10, this results in 12 design points for collecting data observations/measurements. The 12 design points can be executed in a random order. Multiple repeats of the entire 12-point observation/measurement design can be performed.

Calibration system 100 further includes a data acquisition system 40 that collects the data observations/measurements associated with each design point. The data is passed in a suitable format to a processor 42. After the observations/measurements are complete, the data undergoes a post-processing step at processor 42 to average the 180° opposing positions, thereby eliminating concerns regarding the near-level condition of flat surface 22A from the estimation of the calibration coefficients. This results in six averaged "pseudo observations." Subsequent analysis is performed on these six averaged pseudo observations using the linear model and solution approach described above. Note that if flat surface 22A were set perfectly level, then only six design points would be required. However, by relaxing the table leveling requirement and employing the 12-point observation/measurement approach, the calibration system is well-suited for in-situ calibration in non-laboratory conditions. In addition, by computing half the difference between opposing positions, six independent estimates of table levelness are obtained in two axes. A comparison among these estimates forms a convenient approach to detect calibration errors.

The advantages of the present invention are numerous. The positioning and calibration system provide for in-situ calibrations thereby allowing users to check the health and performance of their instrumentation connected to their own data acquisition system. Further, in-situ calibrations provide calibration coefficients that are automatically compensated for the local gravitational field (or other local or induced field of interest to the particular instrument being calibrated) as opposed to current methods that require a mathematical correction to the laboratory-determined coefficients based on a measurement of the local gravitational constant. The present invention's automatic compensation combined with the convenience of not having to return the system for re-calibration are particularly important when an axis sensitive instrument such as an accelerometer system is used at a location that is a significant geographic distance from the calibration laboratory.

Figure 6:
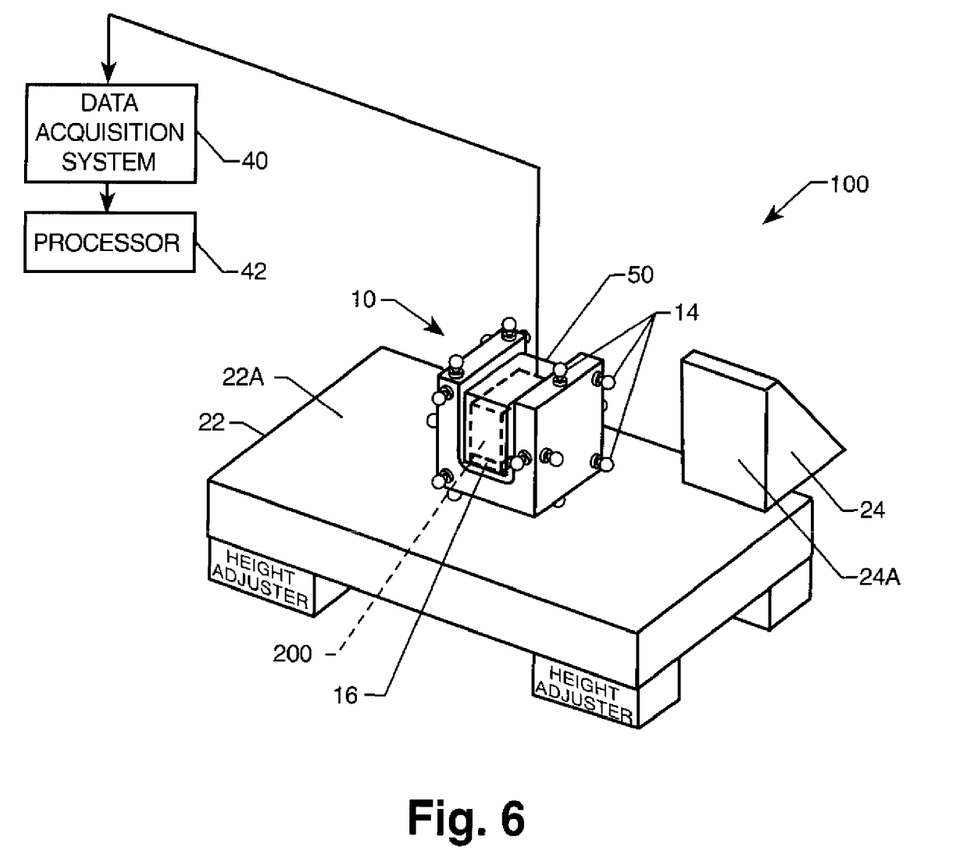
FIG. 6 is a perspective view of another embodiment of a calibration system that is equipped to collect temperature data.
Figure 7:
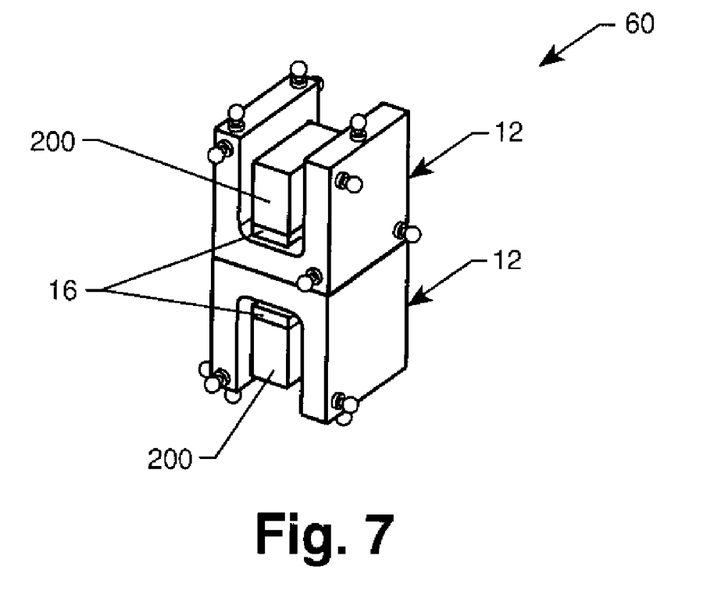
FIG. 7 is a perspective view of an H-configuration positioner shown in isolation for positioning two instruments in a mirror-image orientation.
Figure 8:
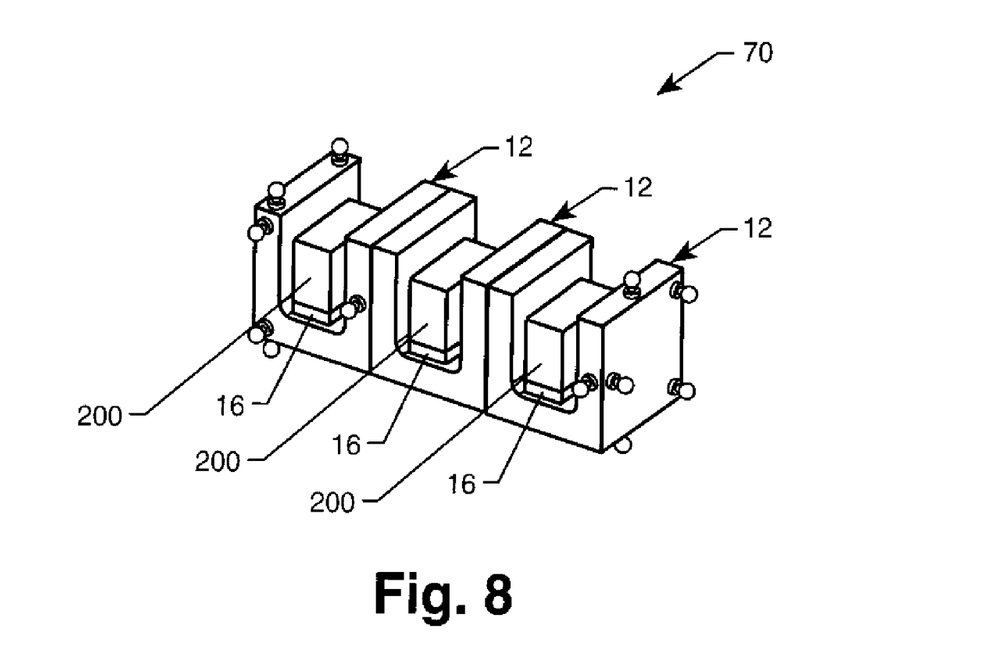
FIG. 8 is a perspective view of another embodiment of a positioner shown in isolation and configured to position multiple instruments in the same orientation.

Although the invention has been described relative to specific embodiments thereof, there are numerous variations and modifications that will be readily apparent to those skilled in the art in light of the above teachings. For example, if the present invention is to be used to also characterize temperature effects on an instrument (e.g. accelerometer), the above-described mechanical interface plate 16 can be realized using a thermal break or insulating material. Then, as shown in FIG. 6, a temperature-controlled chamber 50 can be provided over accelerometer 200. In this case, data acquisition system 40 and processor 42 are equipped to collect/process temperature data as part of the calibration processing using the linear mathematical model previously described. The positioning and calibration systems of the present invention could also be adapted to collect data from multiple accelerometers at each design point. For example, FIG. 7 illustrates an H-configuration positioner 60 in which two accelerometers 200 are mounted in a mirror image orientation, while FIG. 8 illustrates a positioner 70 configured to support three accelerometers 200 in the same orientation. Positioners 60 and 70 could be specially constructed or could be constructed using individual frames 12 that are then coupled together as shown. It is therefore to be understood that, within the scope of the appended claims, the invention may be practiced other than as specifically described.

What is claimed as new and desired to be secured by Letters Patent of the United States is:

1. A positioning system used in the calibration of a single or multi axis sensitive instrument, comprising:
    a rigid cuboidal frame defining six planes and a mounting region within said six planes adapted to have an axis sensitive instrument coupled thereto such that each axis of sensitivity of said instrument is approximately parallel to four planes of said six planes and perpendicular to two opposing ones of said six planes that are not included in said four planes;
    a plurality of feet mounted on said frame to define a resting plane associated with each of said six planes, each said resting plane offset from said frame and parallel to one of said six planes; and
    means for defining first and second flat surfaces that are approximately perpendicular to one another with said first surface adapted to be oriented relative to a local or induced reference field, wherein said frame with said inclinometer coupled thereto is positioned such that said feet associated with one of said resting planes tangentially contact said second flat surface and said feet associated with another of said resting planes tangentially rest on said first flat surface.

2. A positioning system as in claim 1 wherein said instrument is at least one of: an inclinometer, a magnetometer, a gyro and an optical system.

3. A position system as in claim 1 wherein said local or induced reference field is one of: a local gravitational vector, a local magnetic field, a local rotational field, an induced rotational field, a local light field, and an induced light field.

4. A positioning system as in claim 1 wherein each said resting plane is defined by three of said feet.

5. A positioning system as in claim 1 wherein each of said feet is spherical.

6. A positioning system as in claim 1 wherein said first and second flat surfaces are separable from one another.

7. A positioning system as in claim 1 wherein said first and second flat surfaces are joined to one another.

8. A positioning system as in claim 1 further comprising means, coupled to said first flat surface, for leveling said first flat surface.

9. A positioning system used in the calibration of a single or multi axis sensitive instrument, comprising:
    first means defining six planes of tangential contact and a mounting region within said six planes adapted to have an axis sensitive instrument coupled thereto such that each axis of sensitivity of said device is approximately parallel to four planes of said six planes and perpendicular to two opposing ones of said six planes that are not included in said four planes; and
    second means for defining first and second flat surfaces that are approximately perpendicular to one another with said first surface adapted to be oriented relative to a local or induced reference field of interest, wherein said first means is positioned such that one of said six planes tangentially contacts said second flat surface and another of said six planes tangentially contact said first flat surface.

10. A positioning system as in claim 9 wherein said instrument is at least one of: an inclinometer, a magnetometer, a gyro and an optical system.

11. A position system as in claim 9 wherein said local or induced reference field is one of: a local gravitational vector, a local magnetic field, a local rotational field, an induced rotational field, a local light field, and an induced light field.

12. A positioning system as in claim 9 wherein each of said six planes of tangential contact is defined by three protuberances.

13. A positioning system as in claim 9 wherein said first and second flat surfaces are separable from one another.

14. A positioning system as in claim 9 wherein said first and second flat surfaces are joined to one another.

15. A positioning system as in claim 9 further comprising means, coupled to said first flat surface, for leveling said first flat surface.

16. A system for calibrating a single or multi axis sensitive instrument, comprising:
    a rigid cuboidal frame defining six planes and a mounting region within said six planes adapted to have an inclinometer coupled thereto such that each axis of sensitivity of said instrument is approximately parallel to four planes of said six planes and perpendicular to two opposing ones of said six planes that are not included in said four planes;
    a plurality of feet mounted on said frame to define a resting plane associated with each of said six planes, each said resting plane offset from said frame and parallel to one of said six planes;
    means for defining first and second flat surfaces that are approximately perpendicular to one another with said first surface adapted to be oriented relative to a local or induced reference field, wherein said frame with said inclinometer coupled thereto is positioned such that said feet associated with one of said resting planes tangentially contact said second flat surface and said feet associated with another of said resting planes tangentially rest on said first flat surface; and data collection and processing means adapted to be coupled to said instrument for acquiring data generated by said instrument and for generating calibration data using said data so-generated.

17. A positioning system as in claim 16 wherein said instrument is at least one of: a inclinometer, a magnetometer, a gyro and an optical system.

18. A position system as in claim 16 wherein said local or induced reference field is one of: a local gravitational vector, a local magnetic field, a local rotational field, an induced rotational field, a local light field, and an induced light field.

19. A system as in claim 16 wherein said data collection and processing means employs a linear model and multiple linear regression in generating said calibration data.

20. A system as in claim 16 wherein each said resting plane is defined by three of said feet.

21. A system as in claim 16 wherein each of said feet is spherical.

22. A system as in claim 16 wherein said first and second flat surfaces are separable from one another.

23. A system as in claim 16 wherein said first and second flat surfaces are joined to one another.

24. A system as in claim 16 further comprising means, coupled to said first flat surface, for leveling said first flat surface.

25. A system for calibrating a single or multi axis sensitive instrument, comprising:

first means defining six planes of tangential contact and a mounting region within said six planes adapted to have an axis sensitive instrument coupled thereto such that each axis of sensitivity of said instrument is approximately parallel to four planes of said six planes and perpendicular to two opposing ones of said six planes that are not included in said four planes;

second means for defining first and second flat surfaces that are approximately perpendicular to one another with said first surface adapted to be oriented relative to a local or induced reference field, wherein said first means is positioned such that one of said six planes tangentially contacts said second flat surface and another of said six planes tangentially contact said first flat surface; and data collection and processing means adapted to be coupled to said instrument for acquiring data generated by said instrument and for generating calibration data using said data so-generated.

26. A positioning system as in claim 25 wherein said instrument is at least one of: an inclinometer, a magnetometer, a gyro and an optical system.

27. A position system as in claim 25 wherein said local or induced reference field is one of: a local gravitational vector, a local magnetic field, a local rotational field, an induced rotational field, a local light field, and an induced light field.

28. A system as in claim 25 wherein said data collection and processing means employs a linear model and multiple linear regression in generating said calibration data.

29. A system as in claim 25 wherein each of said six planes of tangential contact is defined by three protuberances.

30. A system as in claim 25 wherein said first and second flat surfaces are separable from one another.

31. A system as in claim 25 wherein said first and second flat surfaces are joined to one another.

32. A system as in claim 25 further comprising means, coupled to said first flat surface, for leveling said first flat surface.

* * * * *